United States Patent [19]

Kaczmarek

[11] Patent Number: 5,052,865

[45] Date of Patent: Oct. 1, 1991

[54] DEBURRING APPARATUS

[75] Inventor: Anthony R. Kaczmarek, Toledo, Ohio

[73] Assignee: Dana Corporation, Toledo, Ohio

[21] Appl. No.: 528,749

[22] Filed: May 22, 1990

[51] Int. Cl.$^5$ .............................................. B23F 19/10
[52] U.S. Cl. .............................................. 409/8; 409/9
[58] Field of Search ........................ 409/8, 9, 139, 140

[56] References Cited

U.S. PATENT DOCUMENTS

| | | | |
|---|---|---|---|
| 2,278,300 | 3/1942 | Barber et al. | 409/8 |
| 2,309,218 | 1/1943 | Schwinn . | |
| 2,369,963 | 2/1945 | Gleason | 409/9 |
| 2,441,078 | 5/1948 | Ohr | 409/8 |
| 2,787,195 | 4/1957 | Topolinski | 409/8 |
| 2,916,971 | 12/1959 | McNabb et al. . | |
| 2,921,504 | 1/1960 | Glingener | 409/8 |
| 2,943,537 | 7/1960 | Reusdng | 409/9 |
| 3,001,217 | 9/1961 | Tooker | 15/93 |
| 3,129,638 | 4/1964 | Husby | 409/8 |
| 3,802,314 | 4/1974 | Flint | 409/8 |
| 3,926,091 | 12/1975 | Sloane | 409/8 |

Primary Examiner—Z. R. Bilinsky
Attorney, Agent, or Firm—F. B. McDonald

[57] ABSTRACT

An apparatus for deburring radial end surfaces of axially oriented splines abutting annular grooves formed in workpieces such as mainshaft gears. The apparatus includes an axially oriented reference body and a splined workpiece support member rotatably mounted with respect to the reference body. Design of the apparatus is adaptable for deburring a workpiece having either male or female splines, wherein the splines are located in an annular recess disposed within the workpiece. In a preferred form, the apparatus includes a radially oriented cutting ring adapted to engage a radially extending groove for removal of burrs from rear surfaces of the axially extending splines. Also in a preferred form, the apparatus includes a device for axially adjusting the position of the cutting ring relative to various lengths of splines to be deburred. Finally, in the same preferred form, a spring is employed to axially bias the workpiece against the cutting ring so that the workpiece may be resiliently displaced upon occurrence of force spikes during the deburring process.

14 Claims, 4 Drawing Sheets

DEBURRING APPARATUS

BACKGROUND OF THE INVENTION

This invention relates to tools for finishing metal parts. More particularly, the invention relates to apparatus for deburring splined or toothed workpieces during their manufacture.

The practice of deburring machined articles, such as transmission gears, for example, is standard. Deburring apparatus is designed to remove fragments of metal or "burrs" left on metal surfaces pursuant to shaping operations. Typically, shaper cutters, employed in the cutting of gear splines and teeth, will leave burrs at the edges of the splines or teeth surfaces. More particularly, forming splines of a mainshaft gear involves shaping either an internally or externally projecting annulus axially spaced from a face of the gear. Burrs left upon the rear ends or "backsides" of the splines formed on such annuli are particularly difficult to remove, as they tend to be hidden from view in a recessed annulus of the gear. It would be helpful to have a mechanism capable of complete removal of such burrs without necessity of visual inspection. Moreover, it would be beneficial to assure that backside burrs could never be axially displaced into the interspline spaces (between splines) in the workpiece, as often occurs in the use of conventional burr removal mechanisms.

SUMMARY OF THE INVENTION

The invention described herein provides a mechanism for removal of burrs situated behind the splines or teeth of a workpiece, particularly after a shaping operation which forms the splines or teeth. The apparatus includes a cutting ring having a splined cutting edge, and a workpiece support member rotatable relative to the cutting ring and sharing a common axis therewith. The cutting ring and the support member may have either internally or externally splined mating surfaces to accommodate a workpiece having correspondingly externally or internally splined surfaces in need of deburring. The present invention also contemplates a radially extending locator mounted for axial movement relative to the cutting ring. The locator is engageable with a radial end surface of the workpiece, and "locates" the cutting ring within a radially oriented groove behind the splines to be deburred. Relative rotation of the workpiece with respect to the cutting ring causes the burrs to be removed from the radial ends of the splines which abut the groove.

DETAILED DESCRIPTION OF PREFERRED EMBODIMENTS

Figure 1:
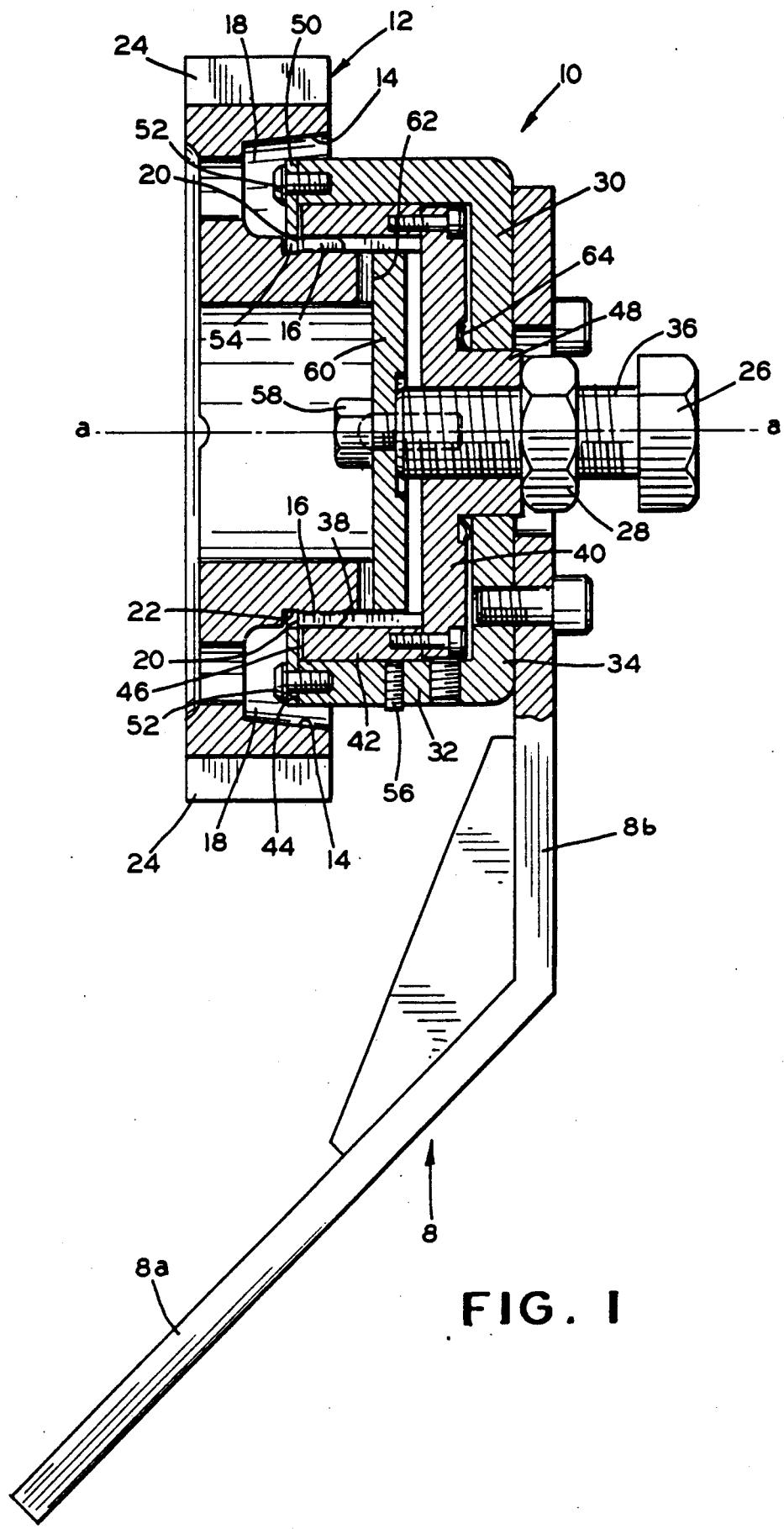
FIG. 1 is a cross-sectional view of a first preferred embodiment of the present invention.

Referring initially to FIG. 1, a deburring apparatus 10 is adapted to remove burrs or fragments of metal from a splined workpiece 12. The workpiece 12 as shown and described herein represents a mainshaft gear designed to be employed in a truck transmission. The gear 12 has a frustoconically tapered synchronizer surface 14 formed radially inwardly of an exterior set of male gear teeth 24. Those skilled in the art will appreciate that the female synchronizer surface 14 is designed to react with a synchronizer device (not shown), and to thereby permit a set of male gear splines 16 on the gear 12 to become speed synchronized with and to engage a female set of gear splines (not shown).

The deburring apparatus 10 is particularly designed to facilitate the deburring of the rear surfaces or edges 20 of the splines 16, those surfaces being situated in an annular recessed area 18. The workpiece 12 is formed into a gear 12 by means of special processes including that of a shaper operation which actually forms the splines 16. To the extent that the successful operation of the shaper even under today's technology still requires the existence of an annular groove 22 behind the splines 16, those skilled in the art will appreciate that burrs or fragments of jagged metal will result from the shaper operation, and the burrs will tend to remain on the rear surfaces 20 of the splines 16. Such burrs are the objects of removal for the deburring apparatus 10 of the present invention.

The apparatus 10 has a stationary exterior housing 30 which includes a cylindrical outerbody 32, the latter defining a longitudinal axis a—a, as shown. A shaft 36 is rotatably supported within the body 32 along the axis a—a, and a radially extending disc 40 is fixed to the shaft 36 for rotation therewith. Mounted on the disc 40 and extending axially thereof is a splined rotary member 42. In the embodiment of FIG. 1, the member 42 incorporates a female set of splines 38 which extend radially inwardly (FIG. 2) so as to theoretically converge at the axis a—a. Radial clearance between the outerbody 32 and the member 42 is preferably about ten thousandths of an inch.

The rotary member 42 and the outer body 32 each define a set of coterminous annular ends 44 and 46, respectively. Those skilled in the art will appreciate that the ends are concentric, and undergo rotary movement with respect to one another. The annular end 44 of the outer body 32 contains a splined cutting ring 50 of a thickness "T", approximately one hundred thousandths of an inch, secured by fasteners 52.

Referring now to FIGS. 2 through 5, the splines 54 of the cutting ring 50 are female, and have the same size and shape as the splines 38 of the rotary member 42. The ring 50 and the annular end 46 are positioned (FIG. 1) for close axial registration with one another to effect a "scissors" cutting action. The two members are preferably urged together under a spring force to maintain a virtually "zero" axial spacing tolerance to provide a most efficient deburring process.

A second disc 60 is fixed to the shaft 36 intermediately of the first disc 40 and the annular end 46 of the rotary member 42. The second disc operates to axially locate the workpiece 12 by engaging the end surface 62 of the workpiece. The axial position of the disc 60 may be adjusted to accommodate workpieces having various axial lengths of splines. For this purpose, the shaft 36 threadably engages, and is hence rotatable within, a hub portion 48 of the first disc 40. The hub acts as a bushing to accommodate rotation of the shaft and rotary member, both of which rotate with the hub, within the housing 30 as shown. An adjuster nut or bolt head 26, fixed to a first end of the shaft, is rotated as necessary to position the disc 60. The disc 60 is secured to the opposite shaft end by a fastener 58.

A jam nut 28 is employed to secure any given selected axial position of the locator disc 60 within the rotary member 42. The nut 28, threaded to the shaft 36, is positioned to frictionally engage the hub 48 to "fix" the position of the locator disc.

A biasing force is provided by a spring 64 supported on a radial portion 34 of the housing 30 and bearing against the disc 40 rigidly secured to the rotatable shaft 36. The force acts, first, to assure the continuous "scissors" cutting action, noted earlier, between the cutting ring 50 and the annular end 46 (of the rotary member 42) by maintaining a normally zero clearance between the latter members. Secondly, the biasing force acts to resiliently "load" the disc 60 against the workpiece 12 for protection of the cutting ring 50 by permitting axial displacement of the workpiece under high impact or "spike" forces occasionally encountered during the deburring process. Such displacement may occur when the cutting ring splines 54 encounter a burr too large for removal upon a single pass. Axial translation of the disc 60 against the spring force permits the workpiece to be axially deflected to avoid overstressing the cutting ring. Subsequent rotational impacts by the cutting ring splines will ultimately successfully remove the larger or more stubborn burrs. The latter feature not only contributes to the longevity of the cutting ring, but, in a manual deburring process, affords an operator a physical "feel" to assure removal of something outside of his or her visual range.

Those skilled in the art will appreciate that for each workpiece 12 having a different length of spline 16, the disc 60 will preferably be adjusted (in the manner earlier described) so as to always bear resiliently against the radial face 62 of the workpiece 12.

The deburring apparatus 10 as shown in FIG. 1 is mounted on a stationary platform 8. Such a platform is adapted to fixedly secure the exterior housing 30 of the apparatus 10, while permitting rotational movement of the internal rotary member 42 and shaft 36 of the apparatus 10. In normal use, the base 8a of the platform is mounted in a horizontal position so as to "angle" the apparatus 10 toward the operator for convenience of use.

Figure 2:
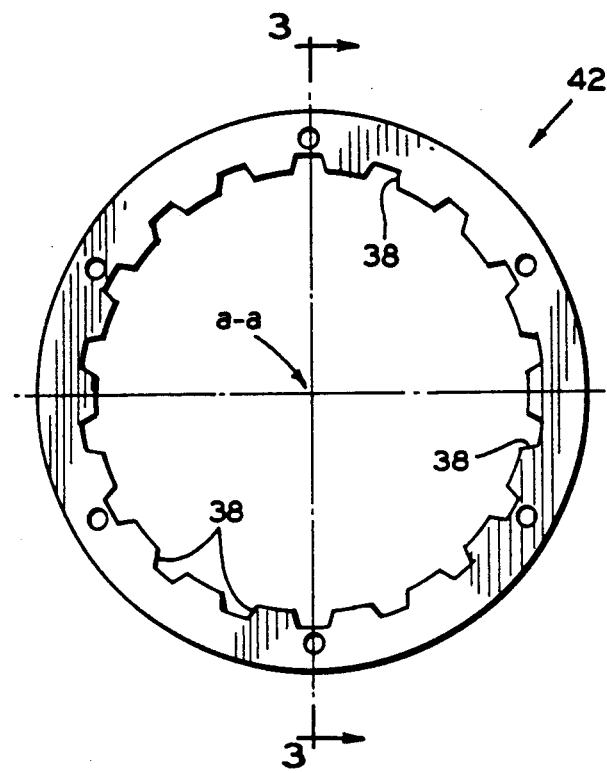
FIG. 2 is a face view of a rotary member employed in the first preferred embodiment of FIG. 1.
Figure 3:
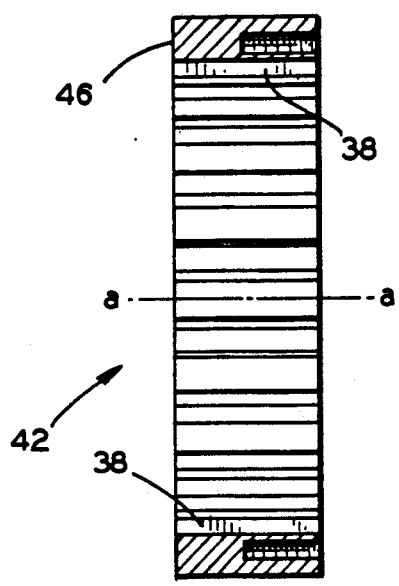
FIG. 3 is a cross-sectional view along lines 3—3 of FIG. 2.
Figure 4:
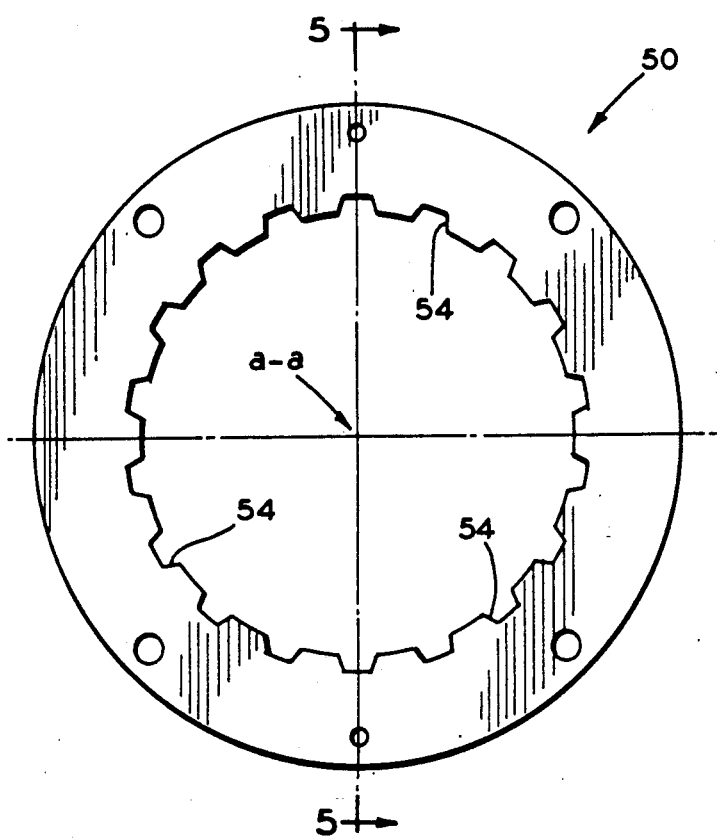
FIG. 4 is a face view of a cutting ring employed in the first preferred embodiment of the present invention.
Figure 5:
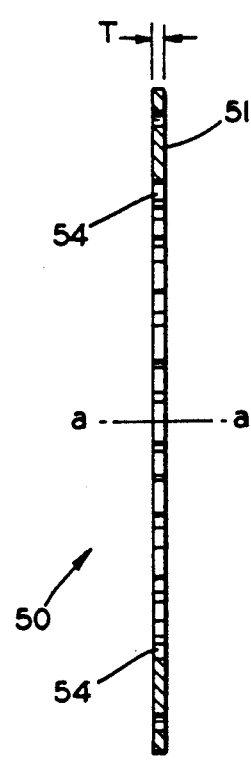
FIG. 5 is a cross-sectional view along lines 5—5 of FIG. 4.

The workpiece 12 is physically installed on and supported by the splines 38 of the rotary member 42. In order for the splines 16 of the workpiece 12 to be installed over the splines 38 of the rotary member 42, it is first necessary that the splines 54 (FIG. 4) of the cutting ring 50 initially be in axial alignment with the rotary member splines 38 (FIG. 2). This is achieved by simply rotating the member 42 (via the bolt head 26) until the splines are visually aligned. Alternately, a spring loaded detent 56 may optionally be employed to permit the operator to manually "feel" the necessary initial alignment.

Physical rotation of the workpiece after insertion of the male gear splines 16 into the female splines 38 of the rotary member 42 results in deburring of the rear radial surfaces 20 of the splines 16. This is because the splined cutting ring 50 is fixed to the cylindrical outer body 32 and does not rotate. Thus the cutting ring remains stationary within the radially oriented annular groove 22 positioned behind the splines 16, and is thus effective to remove burrs from the surfaces 20.

As already noted, in the "scissors-like" deburring action of the apparatus 10, the annular end 46 (FIG. 3) of the rotary member 42 is operatively urged against the active or cutting side 51 (FIG. 5) of the stationary cutting ring 50 under force of the spring 64. As such, it will be appreciated that the splines 38 of the rotary member will engage the entire length of the splines 16 of the workpiece 12 during the deburring process. A particular benefit of this phenomenon is that upon displacement of burrs from the rear surfaces 20, the burrs will never be able to become displaced into the spaces *between* the splines 16 because those spaces will always be occupied by the splines 38. Thus, a major prior art deburring problem, that of "interspline burr displacement", is entirely avoided in the use of the apparatus of the present invention.

Figure 6:
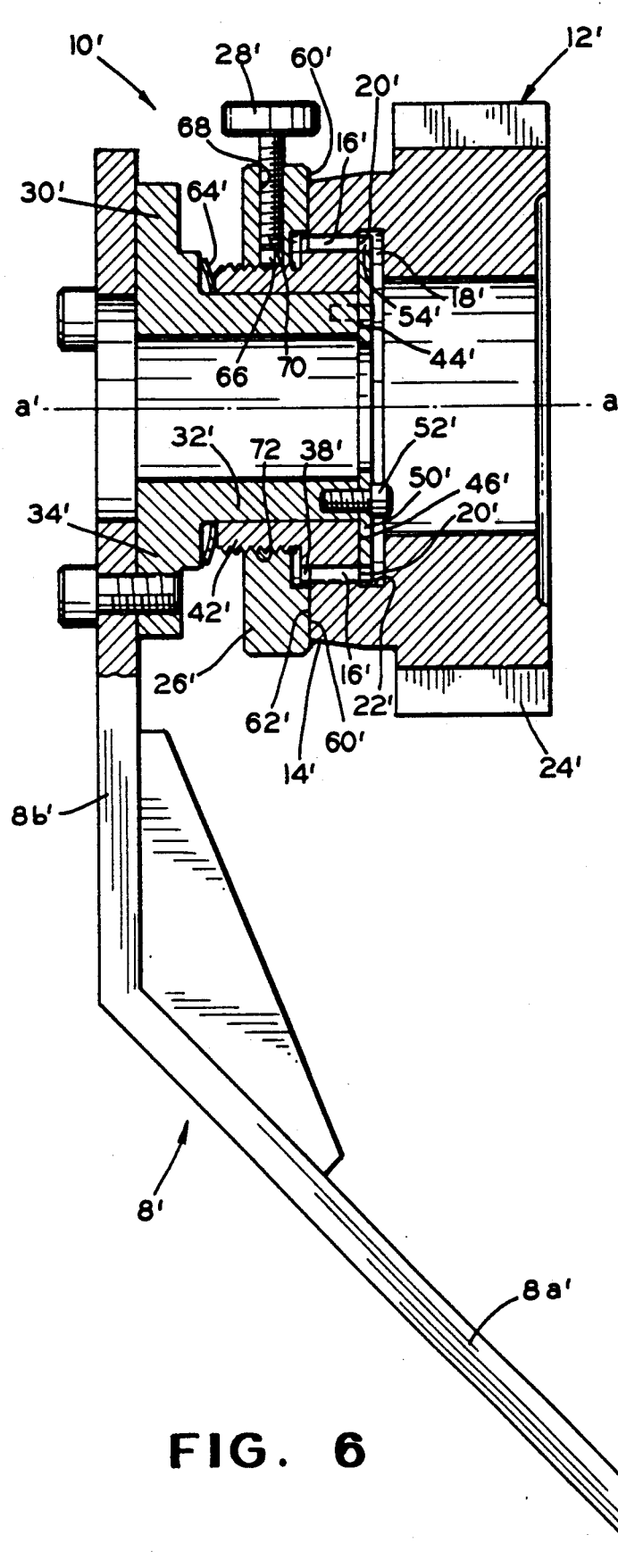
FIG. 6 is a cross-sectional view of a second preferred embodiment of the present invention.

FIG. 6 represents a second embodiment 10' of the deburring apparatus of the present invention. The embodiment 10' is adapted to deburr a workpiece 12' having female (rather than male) splines 16'. The embodiment 10' is analogous to the apparatus 10 in all primary respects, as indicated by the similarly numbered counterpart references. Those skilled in the art will appreciate that the workpiece 12' is also a mainshaft gear, but one having female splines 16'. In addition, the apparatus 10' of FIG. 6 incorporates a frustoconical synchronizer having a male surface 14' as shown.

Figure 7:
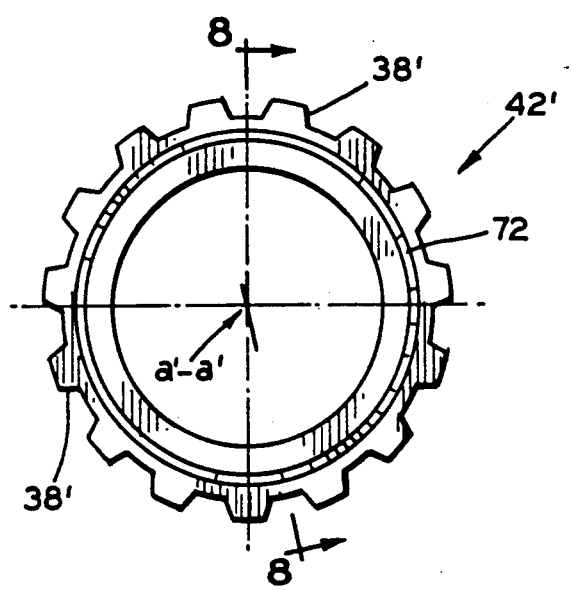
FIG. 7 is a face view of a rotary member utilized in the second preferred embodiment shown in FIG. 6.
Figure 8:
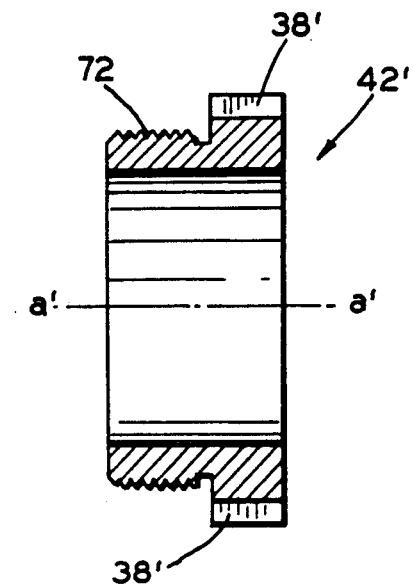
FIG. 8 is a cross-sectional view along lines 8—8 of FIG. 7.
Figure 9:
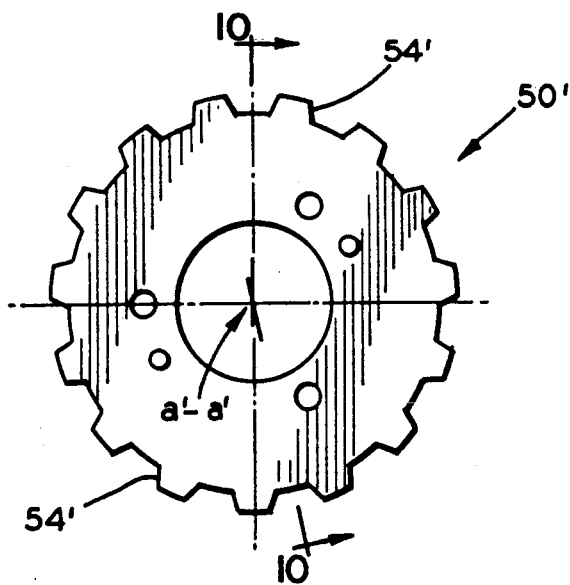
FIG. 9 is a face view of a cutting ring employed in the second preferred embodiment.
Figure 10:
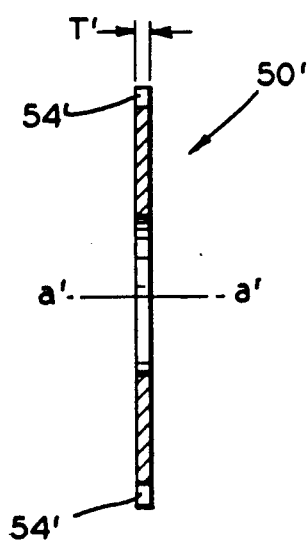
FIG. 10 is a cross-sectional view along lines 10—10 of FIG. 9.

The housing 30' of the embodiment 10' is also designed to remain stationary, being fixed to a mounting plate 8', similar to that of the first embodiment. However, a cylindrical innerbody 32', an integral part of the housing 30', is adapted to extend internally of the splined rotary member 42', which in this embodiment rotates outside, rather than inside, of the cylindrical body 32'. (In this embodiment, there is no counterpart for the shaft 36.) Those skilled in the art will appreciate that the rotary member 42' (see FIGS. 7 and 8) contains exterior male splines 38' which are adapted to engage the mating female splines 16' (FIG. 6) for support of the mounted workpiece 12'. As in the first embodiment, in order for the splines 16' to be installed over the splines 38' of the rotary member, it is necessary for the splines 54' of the cutting ring 50' to be initially in axial alignment. Those skilled in the art will appreciate that in this embodiment, as in the former, the cutting ring is adapted to be operatively situated in a groove 22' behind the female splines 16'. Analogous to the groove 22, the groove 22' is situated in an axially recessed area 18' formed in the workpiece 12' for the purpose of accommodating a shaper mechanism used to form the splines.

Those skilled in the art will also appreciate that the shaft adjuster 26 of the first embodiment is replaced in the second embodiment by an alternate mechanism referred to as a ring adjuster 26'. The ring adjuster 26' contains a forward facing locator surface 60' which functions analogously to the second disc 60 of the first embodiment. The locator surface 60' is adapted to engage the radial face 62' of the workpiece 12'. The locator surface 60' is adjusted as necessary to accommodate various sized lengths of splines 16', always assuring that the cutting ring 50' engages the groove 22'. The jam nut 28 (FIG. 1) of the first embodiment is replaced by a set screw 28'(FIG. 6) which contains a knurled head for physical adjustment. A brass plug 66, situated at the bottom of a bore 68 extending through the ring adjuster 26', prevents the end 70 of the set screw 28' from damaging the male threads 72 (FIGS. 6 and 8) of the rotary member 42' as shown. Thus after the adjuster 28' is rotated to a desired position, the set screw may be tightened to secure the ring adjuster 26' against rotation.

As in the first embodiment, the cutting ring 50' is preferably stationary at all times. To the extent that the latter is mounted to the stationary cylindrical innerbody 32' of the housing 30, which is in turn secured to mounting plate 8', rotation of the workpiece 12' will cause the rotary member 42' to turn about the innerbody 32 to remove burrs from the rear surfaces 20' of the splines 16' (FIG. 6). In a manner similar to the first embodiment, the cutting ring 50' is secured to the innerbody 32' by fasteners 52'.

Finally, those skilled in the art will appreciate that although the cutting ring 50, 50' as herein described is stationary while the workpiece 12 and 12' rotates relative thereto, in some automated applications it may be appropriate to "spin" the cutting ring rather than the workpiece. Those skilled in the art will also appreciate that the mounting base 8, 8' is optional, and that the apparatus may conceivably be hand-held, wherein the workpiece 12, 12' and apparatus 10, 10' may be manually rotated relative to one another.

Although only two preferred embodiments have been detailed and described herein, the following claims envision numerous additional embodiments not mentioned nor described.

What is claimed is:

1. An apparatus for deburring end surfaces of splines extending along an axis of a workpiece, said apparatus comprising:
   a) cutting means adapted to engage radial end surfaces of said splines;
   b) means for rotatably supporting said workpiece relative to said cutting means, said support means having an axially extending surface complimentary to said splines of said workpiece and adapted to axially and radially engage said splines to prevent burr displacement into interspline surfaces of the workpiece; and,
   c) axially adjustable means for locating said workpiece on said support means to assure engagement of said workpiece with said cutting means, said locating means being force biased against a radial end surface of said workpiece for providing spike force protection for said cutting means.

2. The apparatus of claim wherein said cutting means comprises a cutting ring having female splines, and wherein said support means comprises mating female splines adapted for both axial and radial mating registration with said female splines of said cutting ring.

3. The apparatus of claim wherein said cutting means comprises a cutting ring having male splines, and wherein said support means comprises mating male splines adapted for both axially and radial mating registration with said male splines of said cutting ring.

4. The apparatus of claim 2 wherein said workpiece comprises a mainshaft gear having a radial face, said gear comprising a body, a recessed annulus extending axially into the body from said face, wherein said splines of said workpiece extend axially into said recessed annulus, and wherein a groove is positioned in said annulus behind said splines, said groove extending parallel to said face, said cutting ring adapted to be positioned within said groove for removal of burrs from said radial end surfaces of said splines.

5. An apparatus for deburring radial end surfaces of axially oriented splines abutting a radially oriented annular groove formed in a workpiece, said apparatus comprising a reference body defining a longitudinal axis, an axially extending splined support member for rotatably supporting a workpiece relative to said reference body, said support member extending along said longitudinal axis and positioned concentrically with respect to said reference body, said reference body and said support member comprising radially spaced coterminous ends, wherein a splined metal cutting ring is fixed to said reference body, the splines of said cutting ring adapted to radially and axially mate with splines of said support member.

6. The apparatus of claim 5 wherein said reference body is a stationary housing defining a cylindrical outerbody, and wherein said workpiece support member is comprised of (a) a shaft rotatably supported within the housing, (b) a first radially extending disc fixed to said shaft, and (c) an axially extending rotary member fixed to said first disc for rotation within said outerbody.

7. The apparatus of claim 6 further comprising a second disc fixed to said shaft intermediately of said first disc and said coterminous ends, said second disc adapted for engagement of a radial end surface of a splined workpiece, said second disc disposed for resiliently locating said workpiece to retain said cutting ring in said groove, said second disc being biased by a spring and adapted to be resiliently displaced by said workpiece upon a force spike transmitted by the stationary cutting ring during deburring.

8. The apparatus of claim 7 further comprising adjusting means rotatable relative to said rotary member for axially shifting said second disc for locating said cutting ring relative to various workpieces having splines of different lengths, and means on said shaft for securing said adjusting means against rotation relative to said rotary member after adjustment.

9. The apparatus of claim 8 wherein said splines of said cutting ring are female and wherein said splines of said rotary member are also female, said apparatus being adapted to deburr a workpiece having male splines.

10. The apparatus of claim 9 further comprising detent means for assuring initial axial alignment of said splines of said rotary member and said cutting ring for installation of a workpiece over both sets of splines.

11. The apparatus of claim 5 wherein said reference body comprises a cylindrical innerbody, said workpiece support member comprises a cylindrical rotary member concentric with said innerbody and rotatable thereabout, said cutting ring being fixed to said innerbody and comprising male splines, wherein said rotary member and said innerbody comprise radially spaced coterminous annular ends, said splined cutting ring and rotary member being positioned for axial registration with each other and mated to accommodate initial axial alignment between said splines for installation of said workpiece, said apparatus further comprising an adjusting ring threadably mounted on a matingly threaded exterior of said rotary member, said adjusting ring having a radially extending surface engagable with a face of said workpiece for locating said workpiece, said adjusting ring further comprising a threaded bore, a set screw rotatable in said threaded bore and engagable with said exterior threaded surface of said rotary member for axially securing said adjusting ring at specific desired locations on said rotary member.

12. The apparatus of claim 11 further comprising a spring adapted to axially bias said rotary member toward said cutting ring, said spring being supported against said cylindrical innerbody.

13. The apparatus of claim 3 wherein said workpiece comprises a mainshaft gear having a radial face, said gear comprising a body, a recessed annulus extending axially into the body from said face, wherein said splines of said workpiece extend axially into said recessed annulus, and wherein a groove is positioned in said annulus behind said splines, said groove extending parallel to said face, said cutting ring adapted to be positioned within said groove for removal of burrs from said radial end surfaces of said splines.

14. The apparatus of claim 4 wherein said means for locating said workpiece comprises a shaft threadably supported in said rotary member, a locator disc fixed to one end of said shaft, and an adjuster nut fixed to the opposite end of said shaft, a jam nut rotatable on said shaft and positioned intermediately of said shaft ends for frictionally engaging said rotary member for securing any given selected axial position of said locator disc.

* * * * *

UNITED STATES PATENT AND TRADEMARK OFFICE
CERTIFICATE OF CORRECTION

PATENT NO. : 5,052,865
DATED : October 1, 1991
INVENTOR(S) : Anthony R. Kaczmarek It is certified that error appears in the above-indentified patent and that said Letters Patent is hereby corrected as shown below:

Title page, item [57], Abstract: application number "528,749" should be -- 526,749 --.

Signed and Sealed this

Twenty-eighth Day of June, 1994

Attest:

BRUCE LEHMAN

Attesting Officer

Commissioner of Patents and Trademarks